United States Patent
Grobis et al.

(10) Patent No.: US 9,147,423 B2
(45) Date of Patent: Sep. 29, 2015

(54) METHOD FOR IMPROVING A PATTERNED PERPENDICULAR MAGNETIC RECORDING DISK WITH ANNEALING

(75) Inventors: Michael Konrad Grobis, San Jose, CA (US); Olav Hellwig, San Jose, CA (US); Ernesto E. Marinero, Saratoga, CA (US); Andrew Thomas McCallum, San Jose, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 101 days.

(21) Appl. No.: 13/449,279

(22) Filed: Apr. 17, 2012

(65) Prior Publication Data

US 2013/0270221 A1  Oct. 17, 2013

(51) Int. Cl.
| | |
|---|---|
| *B44C 1/22* | (2006.01) |
| *H01L 21/00* | (2006.01) |
| *G11B 5/82* | (2006.01) |
| *G11B 5/855* | (2006.01) |
| *C22C 19/07* | (2006.01) |
| *C22C 1/02* | (2006.01) |

(52) U.S. Cl.
CPC . *G11B 5/855* (2013.01); *C22C 1/02* (2013.01); *C22C 19/07* (2013.01)

(58) Field of Classification Search
CPC .................. H01L 21/31144; H01L 21/32139; H01L 21/047; H01F 10/3222
USPC .................................. 216/22; 438/3; 360/135
See application file for complete search history.

(56) References Cited

U.S. PATENT DOCUMENTS

| | | | |
|---|---|---|---|
| 6,500,497 | B1 | 12/2002 | Wang et al. |
| 6,605,321 | B1 | 8/2003 | Ravelosona-Ramasitera et al. |
| 6,999,279 | B2 | 2/2006 | Lundstrom |
| 7,638,211 | B2 | 12/2009 | Ahner et al. |
| 7,670,696 | B2 | 3/2010 | Fullerton et al. |
| 7,732,071 | B2 | 6/2010 | Fullerton et al. |
| 7,846,565 | B2 | 12/2010 | Fullerton et al. |
| 2001/0005627 | A1* | 6/2001 | Matsubara ..................... 438/637 |
| 2004/0143404 | A1* | 7/2004 | Barros et al. .................... 702/50 |
| 2007/0118938 | A1* | 5/2007 | Sunkara et al. ............... 977/811 |

(Continued)

OTHER PUBLICATIONS

Jung et al., "Effect of nonuniform microstructure on magnetic switching behavior in CoCrPt—SiO2 perpendicular magnetic recording media", Journal of Applied Physics 103, 07F515 2008.
Jung et al., "Effect of Oxygen Incorporation on Microstructure and Media Performance in CoCrPt—SiO2 Perpendicular Recording Media", IEEE Transactions on Magnetics, vol. 43, No. 2, Feb. 2007 615.

(Continued)

*Primary Examiner* — Binh X Tran
*Assistant Examiner* — Thomas Pham
(74) *Attorney, Agent, or Firm* — Thomas R. Berthold (57) ABSTRACT

A method for making a bit-patterned-media magnetic recording disk with discrete magnetic islands includes annealing the data islands after they have been formed by an etching process. A hard mask, such as a layer of silicon nitride or carbon, may be first formed on the recording layer and a patterned resist formed on the hard mask. The resist pattern is then transferred into the hard mask, which is used as the etch mask to etch the recording layer and form the discrete data islands. After the data islands are formed by the etching process, the patterned recording layer is annealed. The annealing may be done in a vacuum, or in an inert gas, like helium or argon, or in a forming gas such as a reducing atmosphere of argon plus hydrogen. The annealing improves the coercivity, the effective saturation magnetization and the thermal stability of the patterned media.

14 Claims, 10 Drawing Sheets

(56) References Cited

U.S. PATENT DOCUMENTS

| | | | |
|---|---|---|---|
| 2007/0212494 A1* | 9/2007 | Xu et al. | 427/401 |
| 2008/0075978 A1* | 3/2008 | Weller et al. | 428/826 |
| 2011/0141620 A1* | 6/2011 | Fan et al. | 360/135 |
| 2012/0080402 A1* | 4/2012 | Xu et al. | 216/22 |
| 2012/0094074 A1* | 4/2012 | Suzuki et al. | 428/141 |
| 2012/0121817 A1* | 5/2012 | Saito et al. | 427/535 |
| 2012/0177948 A1* | 7/2012 | Kikitsu et al. | 428/836 |
| 2013/0084387 A1* | 4/2013 | Hellwig et al. | 427/130 |

OTHER PUBLICATIONS

Zheng et al., "SNR Improvement of Granular Perpendicular Recording Media", IEEE Transactions on Magnetics, vol. 39, No. 4, Jul. 2003 1919.

Zheng et al., "Role of Oxygen Incorporation in Co—Cr—Pt—Si—O Perpendicular Magnetic Recording Media", IEEE Transactions on Magnetics, vol. 40, No. 4, Jul. 2004.

* cited by examiner

METHOD FOR IMPROVING A PATTERNED PERPENDICULAR MAGNETIC RECORDING DISK WITH ANNEALING

BACKGROUND OF THE INVENTION

1. Field of the Invention

This invention relates generally to patterned perpendicular magnetic recording media, such as disks for use in magnetic recording hard disk drives, and more particularly to an improved method for making patterned disks by nanoimprint lithography or similar patterning techniques.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media, also called bit-patterned media (BPM), the magnetic recording layer on the disk is patterned into small isolated data islands arranged in concentric data tracks. While BPM disks may be longitudinal magnetic recording disks, wherein the magnetization directions are parallel to or in the plane of the recording layer, perpendicular magnetic recording disks, wherein the magnetization directions are perpendicular to or out-of-the-plane of the recording layer, will likely be the choice for BPM because of the increased data density potential of perpendicular media. To produce the magnetic isolation of the patterned data islands, the magnetic moment of the spaces between the islands are destroyed or substantially reduced to render these spaces essentially nonmagnetic. Alternatively, the media may be fabricated so that there is no magnetic material in the spaces between the islands. The spaces between the disks may then be filled with nonmagnetic material and the disk may then be planarized to provide a smooth surface.

One technique for making BPM is by etching a full film through a lithographically-patterned mask. Nanoimprint lithography (NIL) is one type of lithographic technique that has been proposed. NIL is based on deforming an imprint resist layer by a master template or mold having the desired nano-scale pattern. The master template is made by a high-resolution lithography tool, such as an electron-beam tool. In one technique, the structure to be imprinted is the disk substrate with the magnetic recording layer and any required underlayers formed on it as continuous layers. Then the liquid imprint resist is deposited on the recording layer. In a modified technique, a hard mask layer is formed on the recording layer and the resist is deposited on the hard mask layer. The imprint resist may be a polymer curable by ultraviolet (UV) light, such as MonoMat available from Molecular Imprints, Inc. The transparent master template is pressed onto the liquid resist and then the resist is exposed to UV light to harden the resist. The template is removed from the imprint resist, leaving an inverse nano-scale pattern of recesses and spaces on the imprint resist. In a modified technique, a hard mask layer is formed on the recording layer and the resist is spin-coated on the hard mask layer. As an alternative to a UV-curable imprint resist, a thermoplastic polymer, like poly-methylmethacrylate (PMMA), may be used as the imprint resist. The polymer is heated above its glass transition temperature. At that temperature, the thermoplastic resist becomes viscous and the nano-scale pattern is reproduced on the imprint resist by imprinting from the template at a relatively high pressure. The patterned imprint resist layer is then used as an etch mask to form the desired pattern of islands in the underlying recording layer, or to transfer the desired pattern into the hard mask layer, which is then used as mask for an additional etching step to form the desired pattern of islands in the underlying recording layer.

The islands in BPM need to have sufficient magnetic quality, for example high coercivity ($H_c$) and saturation magnetization ($M_s$). The islands in BPM also need to be sufficiently small to support high bit areal densities (e.g., 1 Terabit/in$^2$ and beyond). For example, data islands with diameters approximately 20 nm or less may be required. However, it is important that as the size of the islands decreases, the thermal stability of the islands is maintained. The thermal stability of a magnetic grain is to a large extent determined by $K_uV$, where $K_u$ is the magnetic anisotropy constant of the magnetic recording material and V is the volume of the magnetic grain. Thus it is important that the islands maintain a high $K_uV$ for thermal stability. The BPM fabrication process can introduce a variety of defects in the magnetic islands, which suppress thermal stability and add undesirable variation to the island properties.

What is needed is a method for making a BPM disk with nanoimprint lithography that results in small data islands with sufficient magnetic quality and thermal stability.

SUMMARY OF THE INVENTION

The invention is a method for making a BPM disk with discrete magnetic islands formed of an oxide-free cobalt-chromium-platinum(CoCrPt) alloy. The CoCrPt recording layer is patterned into the discrete data islands by etching through a lithographically patterned mask, for example by nanoimprinting. A hard mask, such as a layer of silicon nitride or carbon, may be first formed on the recording layer and the patterned resist formed on the hard mask. The resist pattern is then transferred into the hard mask, which is used as the etch mask to etch the recording layer and form the discrete data islands. The sidewalls and tops of the discrete data islands are often damaged by the etching process. Although this damage can be relatively small in actual size, because of the small dimensions of the data islands the damage can result in a significant volume of the CoPtCr material in the data islands being magnetically damaged. After the data islands are formed by the etching process, the patterned recording layer is annealed. The annealing may be done in a vacuum, or in an inert gas, like helium or argon, or in a forming gas such as a reducing atmosphere of argon plus hydrogen. The annealing may be done before removal of the hard mask material, but is preferably done after removal of the hard mask material and before deposition of the protective disk overcoat. The annealing has been found to significantly improve the coercivity, the effective saturation magnetization and the thermal stability of the patterned media.

For a fuller understanding of the nature and advantages of the present invention, reference should be made to the following detailed description taken together with the accompanying figures.

DETAILED DESCRIPTION OF THE INVENTION

Figure 1:
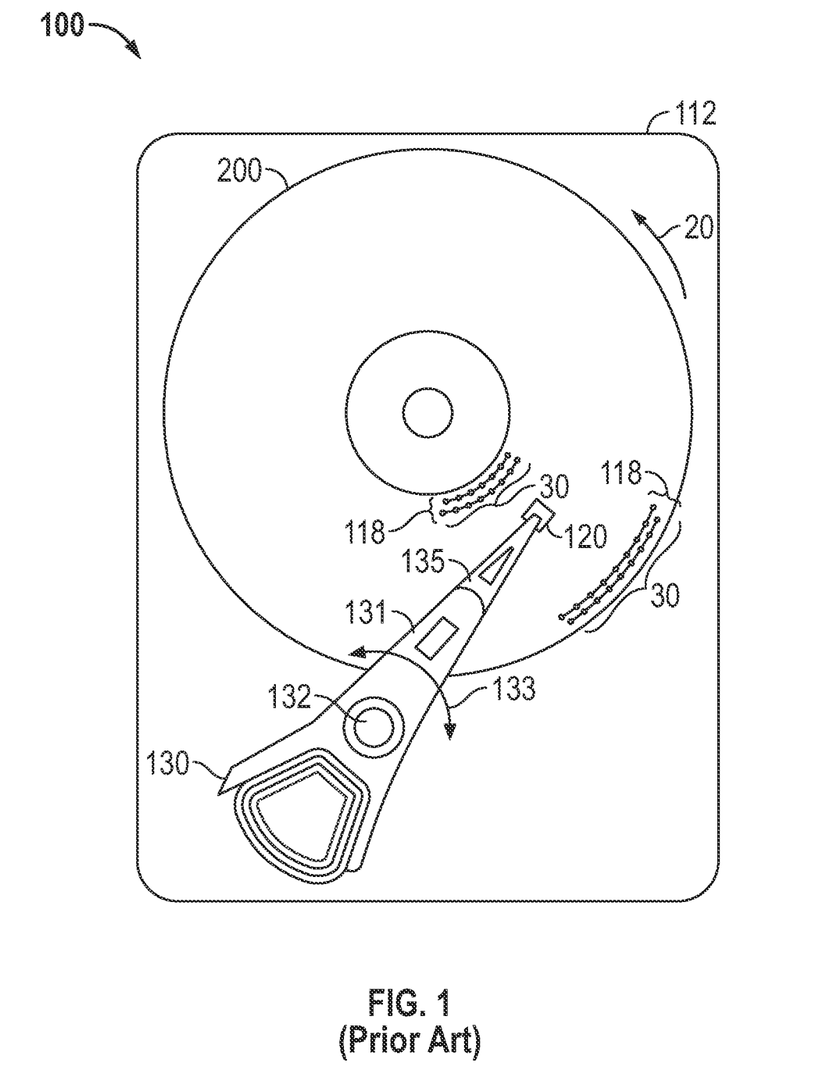
FIG. 1 is a top view of a perpendicular magnetic recording disk drive with bit-patterned media (BPM) and shows the patterned data islands arranged in concentric circular data tracks according to the prior art.

FIG. 1 is a top view of a patterned-media magnetic recording disk drive 100 with a patterned-media magnetic recording disk 200. The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and read/write head associated with each surface of each disk.

The patterned-media magnetic recording disk 200 includes a hard or rigid disk substrate and discrete data islands 30 of magnetizable material on the substrate. The data islands 30 are arranged in radially-spaced circular tracks 118, with only a few islands 30 and representative tracks 118 near the inner and outer diameters of disk 200 being shown in FIG. 1. The islands 30 are depicted as having a circular shape but the islands may have other shapes, for example generally rectangular, oval or elliptical. As the disk 200 rotates in the direction of arrow 20, the movement of actuator 130 allows the read/write head on the trailing end of slider 120 to access different data tracks 118 on disk 200.

Figure 2:
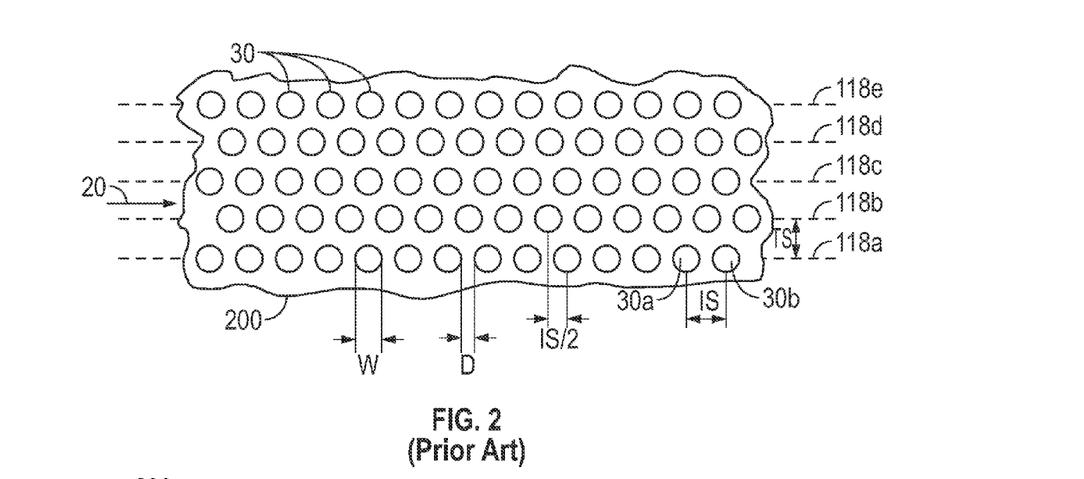
FIG. 2 is a top view of an enlarged portion of a prior art BPM disk showing the detailed arrangement of the data islands.

FIG. 2 is a top view of an enlarged portion of disk 200 showing the detailed arrangement of the data islands 30 on the surface of the disk substrate in one type of pattern according to the prior art. The islands 30 contain magnetizable recording material and are arranged in circular tracks spaced-apart in the radial or cross-track direction, as shown by tracks 118a-118e. The tracks are typically equally spaced apart by a fixed track spacing TS. The spacing between data islands in a track is shown by distance IS between data islands 30a and 30b in track 118a, with adjacent tracks being shifted from one another by a distance IS/2, as shown by tracks 118a and 118b. Each island has a lateral dimension W parallel to the plane of the disk 200, with W being the diameter if the islands have a circular shape. The islands may have other shapes, for example generally rectangular, oval or elliptical, in which case the lateral dimension W may be considered to be the smallest dimension of the non-circular island, such as the smaller side of a rectangular island. The adjacent islands are separated by nonmagnetic regions or spaces, with the spaces having a lateral dimension D. The value of D may be greater than the value of W. To achieve data densities in the range of about 1 Terabits/$in^2$, W is required to be between about 15-20 nm and IS between about 20-30 nm.

BPM disks like that shown in FIG. 2 may be perpendicular magnetic recording disks, wherein the magnetization directions are perpendicular to or out-of-the-plane of the recording layer in the islands. To produce the required magnetic isolation of the patterned data islands 30, the magnetic moment of the regions or spaces between the islands 30 must be destroyed or substantially reduced to render these spaces essentially nonmagnetic. The term "nonmagnetic" means that the spaces between the islands 30 are formed of a non-ferromagnetic material, such as a dielectric, or a material that has no substantial remnant moment in the absence of an applied magnetic field, or a magnetic material in a trench recessed far enough below the islands 30 to not adversely affect reading or writing. The nonmagnetic spaces may also be the absence of magnetic material, such as trenches or recesses in the magnetic recording layer or disk substrate.

Figure 3A:
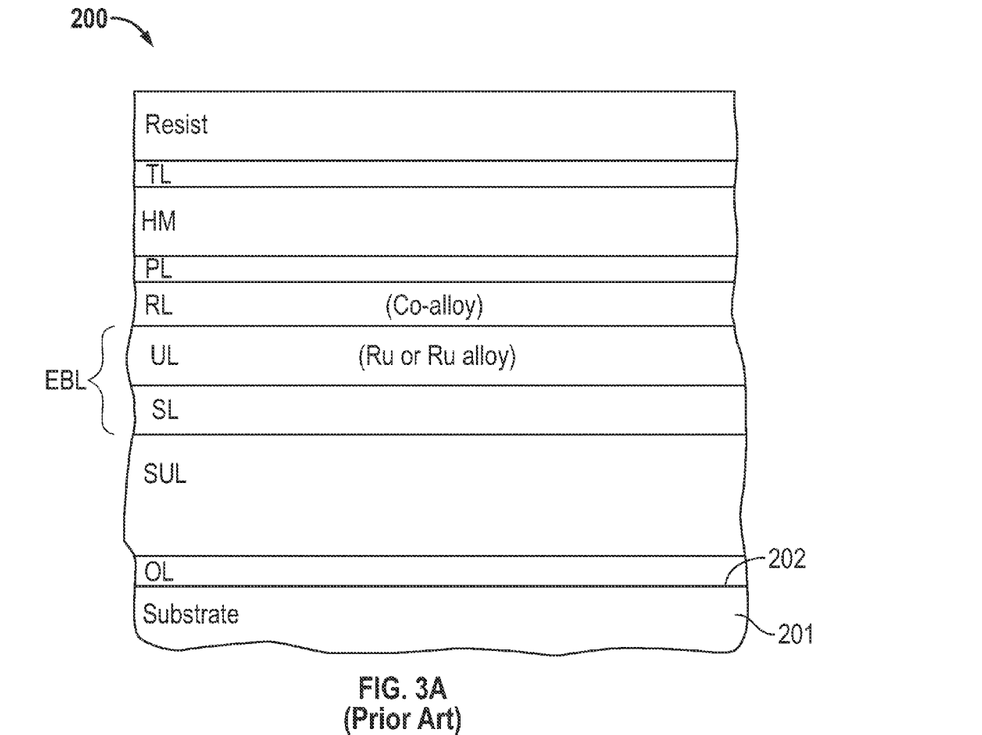
FIGS. 3A-3E are sectional views of a BPM disk at various stages of nanoimprinting, etching and planarizing the disk according to the prior art.

FIG. 3A is a sectional view showing the disk 200 according to the prior art before lithographic patterning and etching to form the BPM disk. The disk 200 is a substrate 201 having a generally planar surface 202 on which the representative layers are deposited, typically by sputtering. The disk 200 is depicted as a perpendicular magnetic recording disk with a recording layer (RL) having perpendicular (i.e., generally perpendicular to substrate surface 201) magnetic anisotropy and an optional soft magnetic underlayer (SUL) below the RL. The optional SUL serves as a flux return path for the magnetic write field from the disk drive write head.

The hard disk substrate 201 may be any commercially available glass substrate, but may also be a conventional aluminum alloy with a NiP surface coating, or an alternative substrate, such as silicon or silicon-carbide. An onset layer (OL) for the growth of the SUL may be an AlTi alloy or a similar material with a thickness of about 2-10 nm that is deposited on the substrate surface 202.

The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

The RL in the discrete magnetic islands is a ferromagnetic material, like a ferromagnetic cobalt (Co) alloy. If the RL is a Co alloy it is grown on a growth-enhancing underlayer (UL) that induces the crystalline C-axis of the Co alloy to be perpendicular to the plane of the RL, so that the RL has strong perpendicular magnetocrystalline anisotropy. The UL may be a Ru or Ru alloy layer, or an optional bilayer that includes an oxide onset layer directly below the RL. One or more seed layers (SL), like a NiW or NiWCr alloy layer, may be deposited on the SUL to enhance the growth of the Ru-containing UL. If the optional SUL is present, then the UL and SL also function as an exchange-break layer (EBL) that breaks the magnetic exchange coupling between the magnetically permeable films of the SUL and the RL.

An optional thin protection layer (PL), for example a 1.5 nm thick silicon nitride layer, is deposited directly on the RL. The silicon nitride layer also improves the adhesion of the subsequently deposited hard mask (HM) layer and acts as an etch stop during the HM removal process. The term "silicon nitride" shall mean $Si_3N_4$ and deviations from this stoichiometry, including nitrogen-deficient silicon nitride with unsaturated dangling bonds of Si (commonly referred to as $SiN_x$) wherein the total amount of Si can be up to 50 atomic percent, i.e., equal amounts of Si and N. A hard mask (HM) layer is deposited on the PL. The HM layer may be diamond-like carbon (DLC) with a thickness between about 15-20 nm. Other materials for the HM layer include nitrogenated DLC, amorphous carbon with a lower density than DLC, Ta and silicon nitride. A thin transfer layer (TL), for example a 2 nm thick silicon nitride layer, may be deposited on the HM. The purpose of the optional TL is to enhance the adhesion of the subsequently deposited imprint resist or to assist the pattern transfer.

All of the layers from the OL through the TL may be deposited by sputter deposition in the same vacuum chamber. After deposition of the TL, the structure is removed and placed in the nanoimprint lithography tool, for example the HD2200 or HD7000 from Molecular Imprints, Inc. A layer of liquid imprint resist is then deposited over the TL, preferably by inkjet technology, or alternatively by spin coating.

Figure 3B:
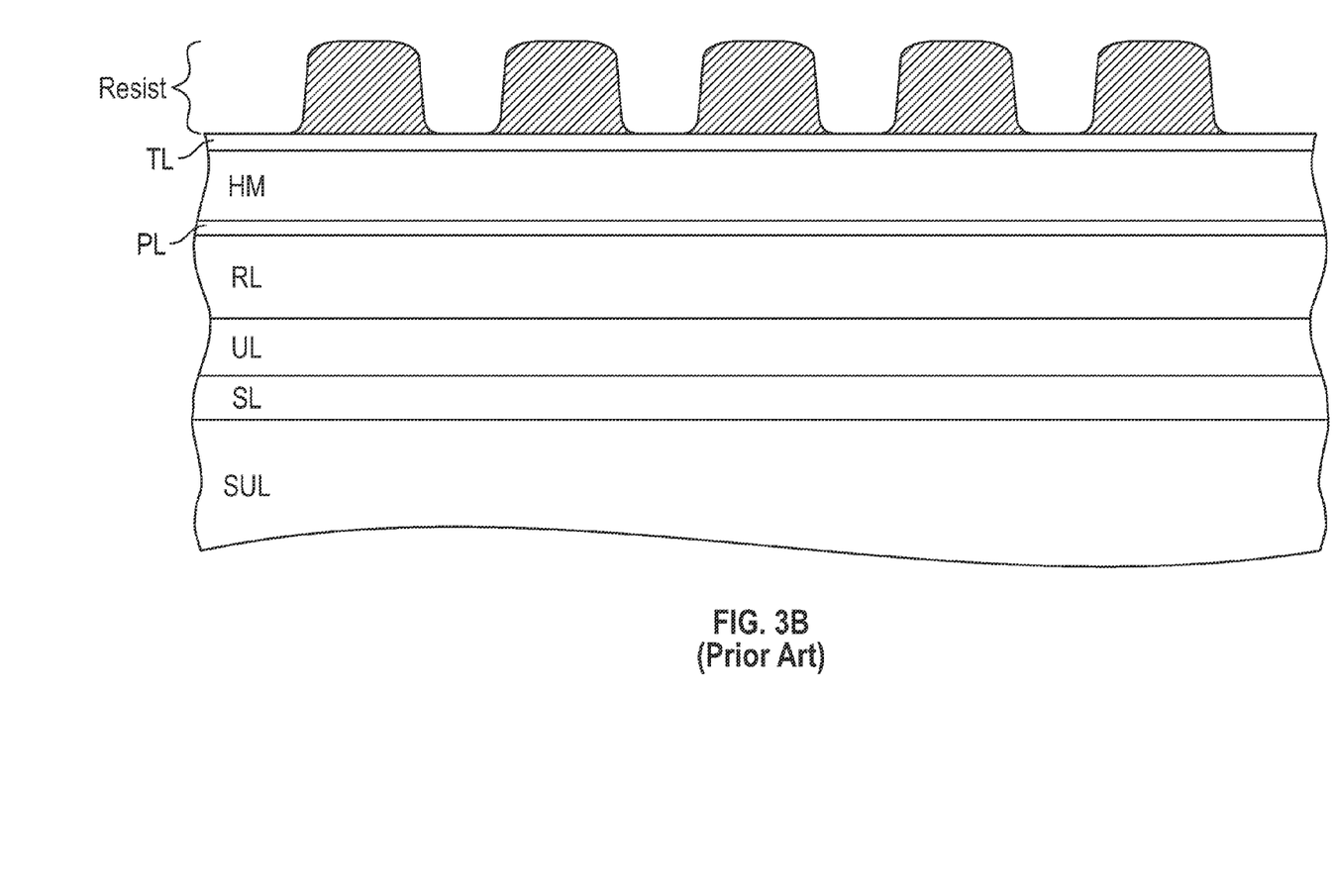

The structure of FIG. 3A is then lithographically patterned by nanoimprinting with a template or mold that has the desired pattern of data islands and nonmagnetic regions. The transparent template with its predefined pattern is brought into contact with the liquid imprint resist layer, which is a UV-curable polymer, and the template and disk are pressed together. UV light is then transmitted through the transparent template to cure the liquid imprint resist. After the resist has hardened the template is removed, leaving the inverse pattern of the template on the hardened resist layer. The template is separated from the disk and the patterned resist is left on the HM layer. The resulting structure is shown in FIG. 3B.

Figure 3C:
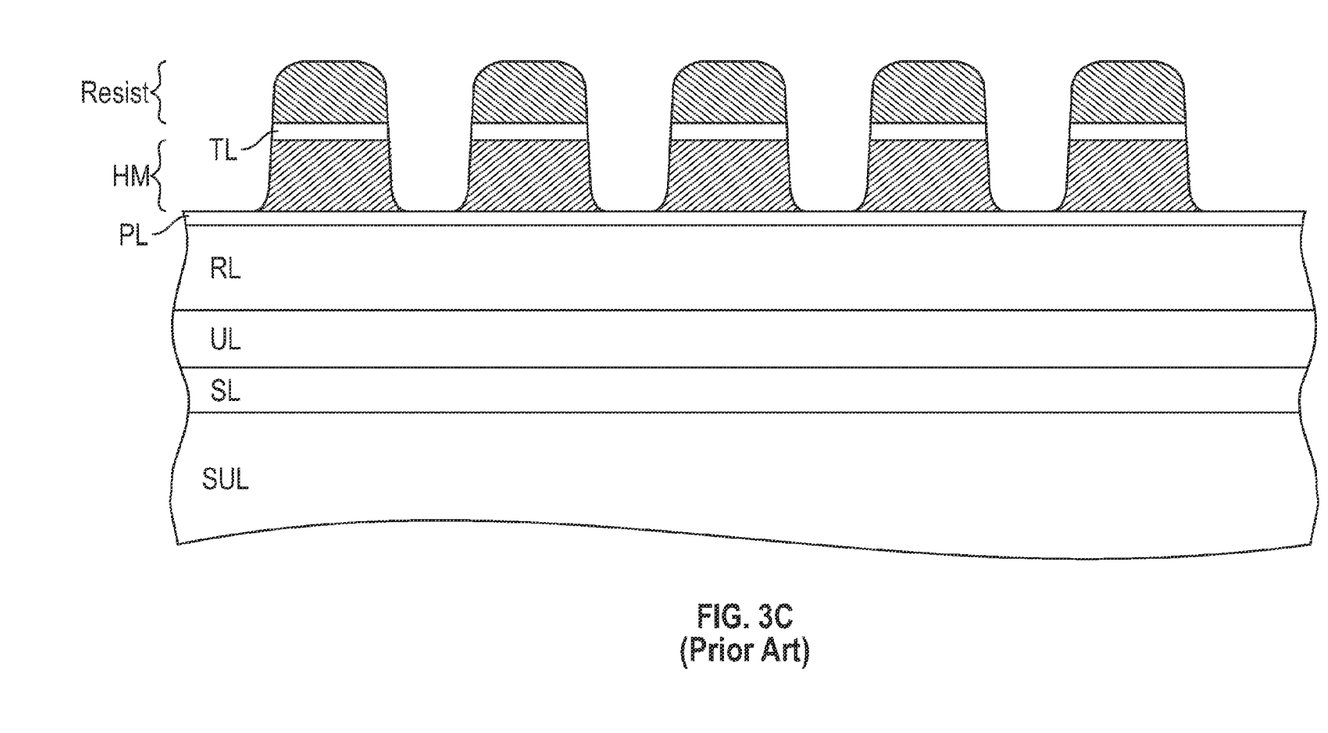

The patterned imprint resist is then used as an etch mask. Reactive-ion-etching (RIE) can be used to transfer the pattern from the imprint resist to the underlying HM layer. The resulting structure is shown in FIG. 3C.

Figure 3D:
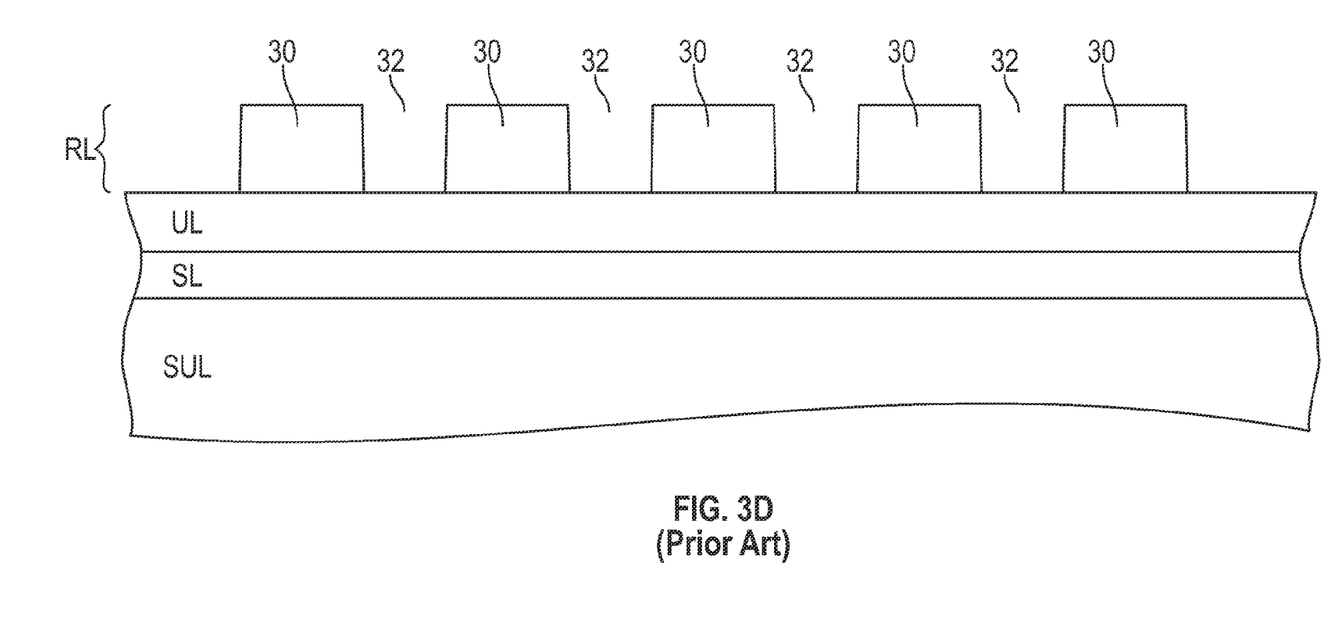

The patterned HM layer is then used as a mask to etch or ion mill the RL and thereby form (transfer) the pattern of data islands into the RL. The HM is removed by an oxygen plasma etch, a hydrogen plasma etch or a mixed plasma etch, leaving the structure as shown in FIG. 3D, wherein the RL is patterned into the data islands 30 and nonmagnetic recesses 32. Because the PL acts as an etch stop for the HM removal, some portion of it may remain on top of the RL, but is not shown in FIG. 3D. As shown in FIG. 3D, the etching is preferably performed to a depth that removes all of the RL material so that there is no RL material in the recesses 32. It is preferable to stop the etching at the UL, however some UL material may be removed as well. If the optional SUL is used, there should be enough UL and SL material below the RL to break the magnetic exchange between the RL islands 30 and the SUL.

Figure 3E:
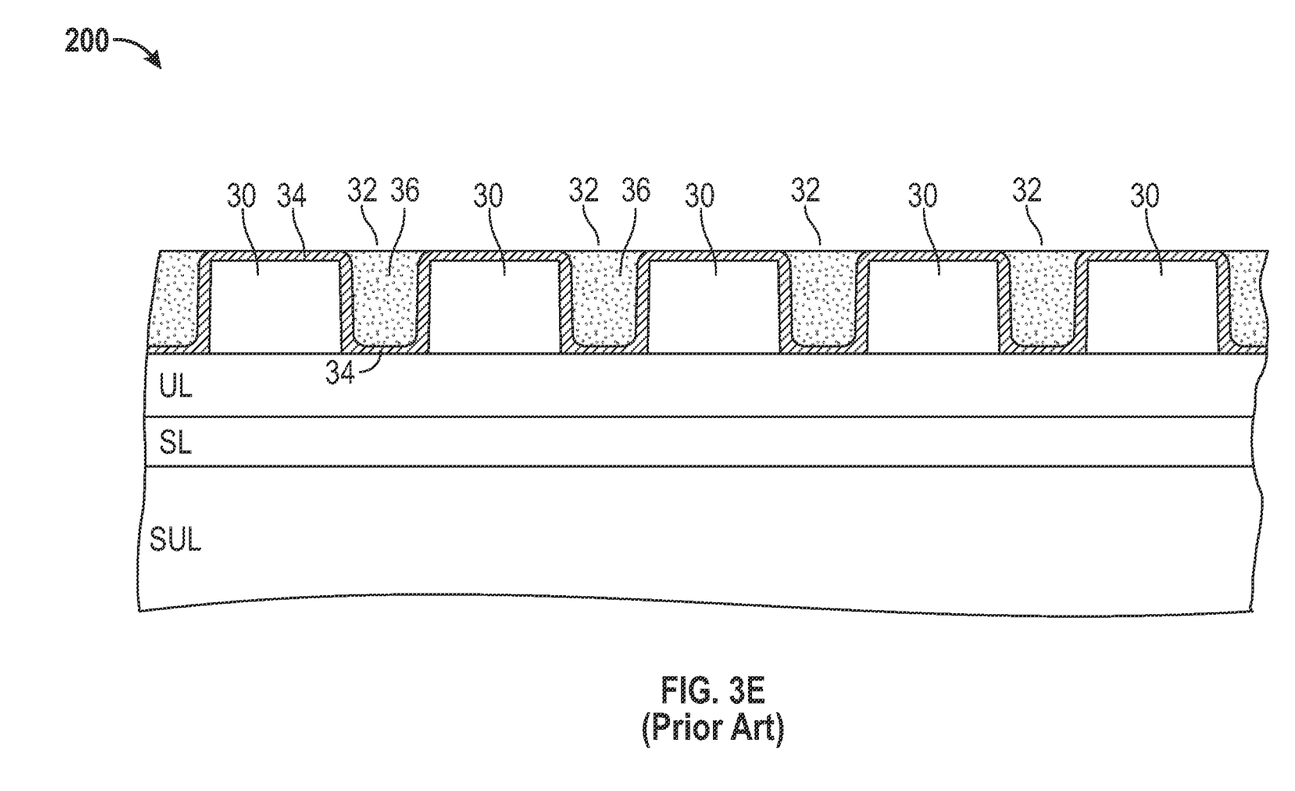

FIG. 3E is a sectional view of the etched disk 200 of FIG. 3D after deposition of an optional protective overcoat (OC) 34 into the recesses 32 and over the tops of islands 30 and after deposition and optional chemical-mechanical-polishing (CMP) of fill material 36 in the recesses 32. The OC 34 may be sputter-deposited amorphous carbon, like DLC, which may also be hydrogenated and/or nitrogenated. Other materials that may be used for the OC include carbides such as silicon carbides and boron carbides; nitrides such as silicon nitrides ($SiN_x$), titanium nitrides, and boron nitrides; metal oxides, such as $TiO_2$, $ZrO_2$, $Al_2O_3$, $Cr_2O_3$, $Ta_2O_5$ and $ZrO_2$—$Y_2O_3$; and mixtures of these materials. The fill material 36 may be an inorganic material, such as $SiO_2$ or $Al_2O_3$, or a polymeric material, or a nonmagnetic metal, like Cu. The CMP results in essentially a planarized disk surface. A layer of conventional liquid lubricant (not shown) may be deposited, for example by spin coating, on the surface of the disk 200.

In this invention the RL in the discrete magnetic islands is a cobalt-chromium-platinum (CoCrPt) alloy. While Co-alloy magnetic layers for conventional continuous magnetic recording disks typically include an oxide, like $SiO_2$, to form isolated exchange de-coupled grains, in this invention it is required that the CoCrPt-alloy material in the data islands be oxide-free. This is because full films of the RL, before formation of the discrete magnetic islands, need to be continuous fully exchange-coupled magnetic films. As part of the development of this invention, it has been discovered that if the CoCrPt islands have the small lateral dimension required to achieve 1 Tb/in$^2$ areal density, the above-described prior-art nanoimprint lithography process causes significant magnetic damage to the data islands.

Figure 4A:
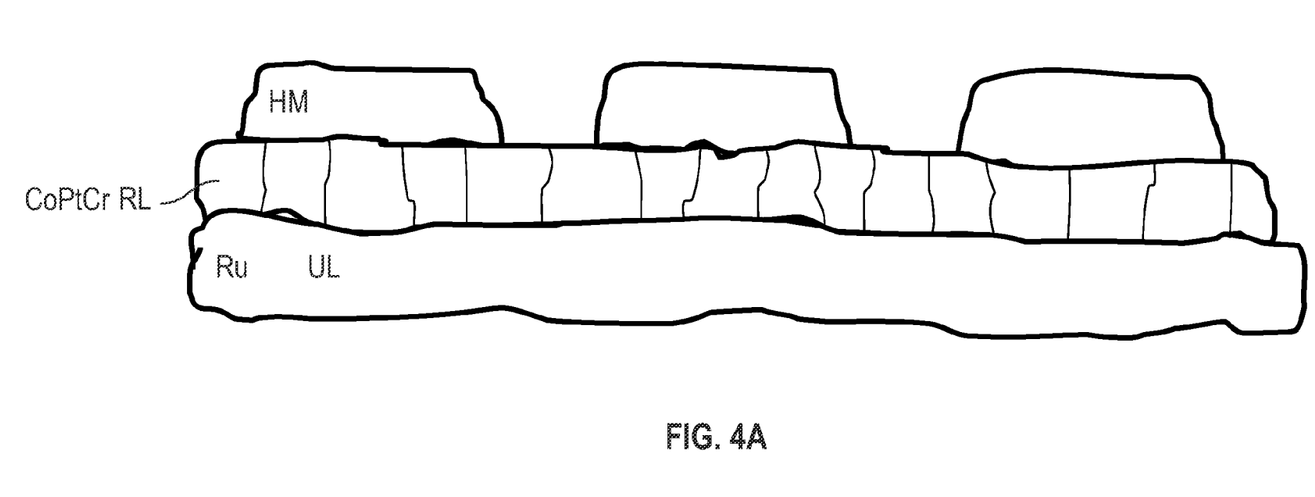
FIGS. 4A-4C are schematic sectional views of the patterned media structure at various stages of ion milling and hard mask removal for illustrating damage to the data islands.
Figure 4B:
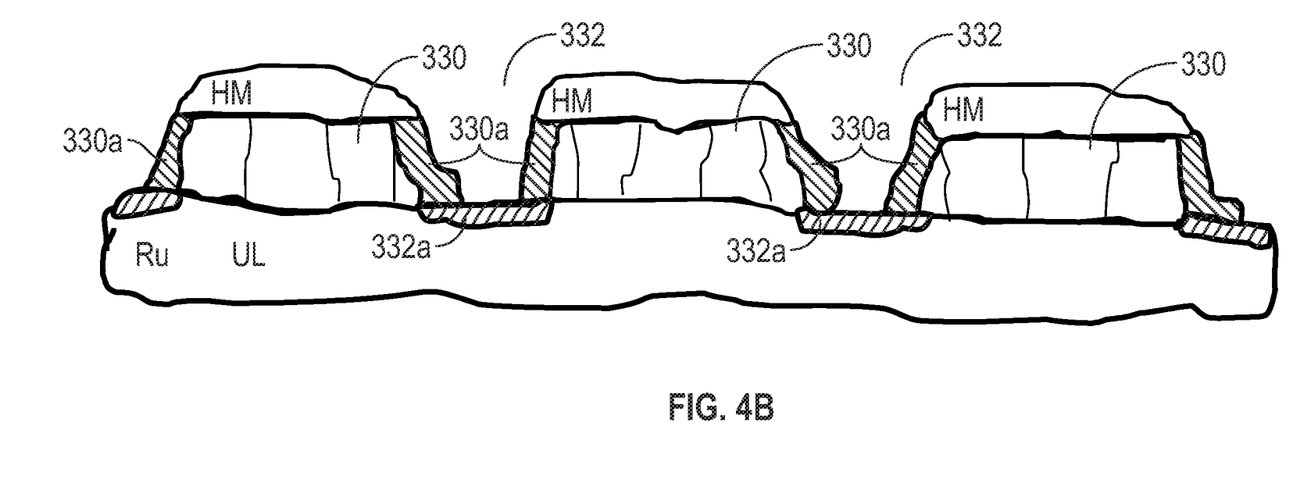
Figure 4C:
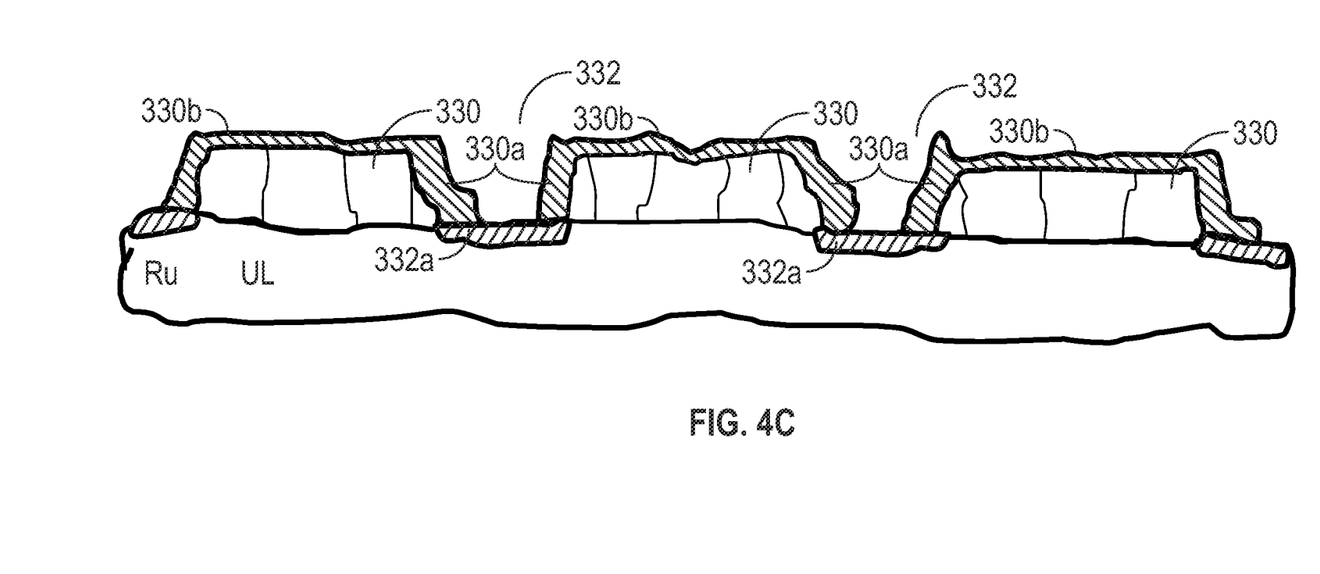

FIG. 4A is a schematic sectional view showing the patterned media structure made according to the method of this invention with a Ru UL and CoCrPt RL after the HM layer on top of the CoCrPt RL has been patterned, preferably by nanoimprinting. However, in this invention the structure of FIG. 4A can be made by lithographic patterning processes other than nanoimprinting. FIG. 4B is a schematic sectional view showing the patterned media structure after ion milling of the RL, using the patterned HM layer as a mask, and thereby forming the CoCrPt data islands 330 and nonmagnetic recesses 332. FIG. 4B shows damaged or oxidized sidewalls regions 330a on the data islands 330 and oxidized Ru regions 332a in the recesses 332 as a result of the ion milling. FIG. 4C is a schematic sectional view showing the patterned media structure after removal of the HM layer, which is typically done by a plasma etch. FIG. 4C shows additional damaged or oxidized top regions 330b on the data islands 330 as a result of the process of HM removal. FIGS. 4A-4C thus illustrate how the ion milling of the HM layer, and subsequent removal of the HM material, can damage the data islands, particularly the sidewalls. This damage can be relatively small, for example only 1-2 nm, but for small lateral dimensions of the data islands, e.g., 15-20 nm, can result in up to 40% of the volume of the CoPtCr material in the data islands being magnetically damaged.

In this invention the patterned media is annealed after the etching has formed the discrete data islands. The structure of FIG. 4C is annealed to a temperature preferably between about 350-400° C. for between about 1 to 60 minutes, preferably for at least 30 min. The annealing is preferably done either in a high vacuum, e.g., at most $1 \times 10^{-6}$ mbar, or in an inert gas, like helium or argon, or in a forming gas such as a reducing atmosphere of argon plus hydrogen. The annealing is done preferably after removal of the HM material, and before deposition of the OC and subsequent planarization, i.e., between the steps shown by the prior art steps in FIG. 3D and FIG. 3E. The annealing may also be done before removal of the HM material, i.e., annealing is performed on the structure shown in FIG. 4B. The annealing may also be done after planarization, i.e., after deposition and optional chemical-mechanical-polishing (CMP) of fill material in the recesses 332 between the data islands 330, like in FIG. 3E.

Figure 5:
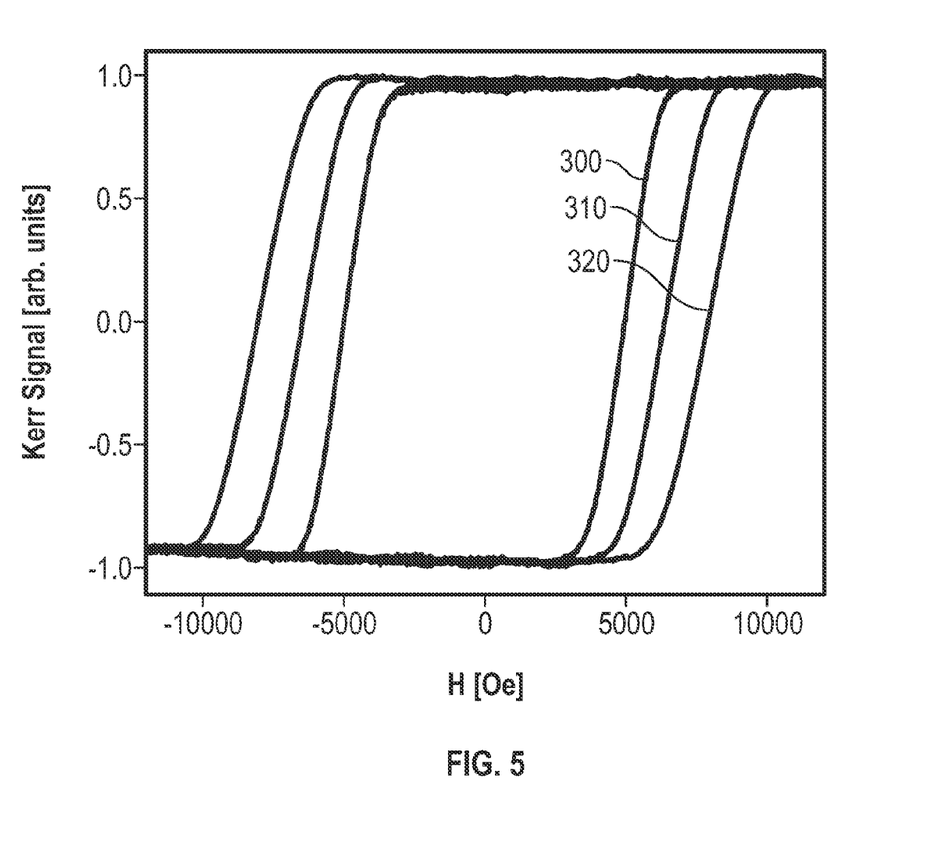
FIG. 5 is a Kerr angle hysteresis loop for an area of patterned CoCrPt islands for an as-prepared sample and for samples after two different annealing steps.

The annealing has been found to significantly improve the coercivity ($H_c$) of the patterned media. FIG. 5 shows a Kerr angle hysteresis loop for $Co_{70}Cr_{18}Pt_{12}$ (where subscripts are in atomic percent) islands patterned over an area of approximately 64 mm$^2$ for an as-prepared sample and for samples after two different annealing steps. The HM material was not removed prior to annealing in this example. Curve 300 for the as-prepared sample shows an average Hc of about 5 kOe. Annealing at 400° C. for 5 min. increases $H_c$ to about 6.4 kOe (curve 310), while annealing at 400° C. for 30 min. increases $H_c$ to about 8 kOe (curve 320).

The annealing has been found to also significantly increase the effective saturation magnetization ($M_{s,eff}$) of the patterned media. In one example, $M_{s,eff}$ was increased from 200 emu/cc to 350 emu/cc after vacuum annealing in $1 \times 10^{-7}$ mbar at 370° C. for 30 min. A higher $M_{s,eff}$ means more readback signal per island, which is especially important when scaling islands to diameters below about 20 nm, i.e., for areal densities greater than 1 Tb/in$^2$. The minimum achievable island diameter is approximately 3 nm, which is the minimum size for thermal stability limit for the highest anisotropy material, Co$_3$Pt, so the range of island diameters where the invention is especially advantageous is between about 5-20 nm. $M_{s,eff}$ may increase due to changes in island magnetic material composition or due to recovery of material damaged during media patterning, i.e., an increase in the magnetic volume of the islands.

The annealing has been found to also significantly increase the thermal stability ($K_u V$) of the individual islands. In one example, $K_u V/k_B T$ was increased from 150 to 310 after vacuum annealing at 380° C. for 30 min. Thus the annealing significantly improves the thermal stability of the small data islands.

The non-patterned areas of the recording layer next to the patterned islands did not show any significant changes in magnetic properties after annealing. This indicates that the improvement in magnetic properties is only observed for previously patterned recording layer material and not for full films of the same material.

The improved magnetic quality and thermal stability as a result of the annealing is especially pronounced and thus much more significant for small data islands, i.e., those with a lateral dimension W less than about 25 nm, particularly less than about 20 nm. This is because the island sidewalls and tops damaged from the ion milling and HM removal form a substantially larger percentage of the overall island volume. It is believed that the annealing repairs the damaged data islands because the Cr in the CoCrPt alloy may form a protective Cr or Cr-oxide shell at the sidewalls and tops of the data islands. Also, because Cr diffuses from the cores of the islands to the tops and sidewalls of the islands, this leaves mostly CoPt material in the island cores, which results in a higher anisotropy. Thus the benefit of the inventive method may be more pronounced if the data islands are formed of a high-Cr material, for example with Cr present in the CoCrPt alloy greater than about 10 atomic percent. The high-Cr material for the recording layer may also result in a Cr-oxide protection film at the upper surface of the RL, which may eliminate the need for the silicon nitride PL (FIG. 3A) required in the prior art. Furthermore, the elimination of the PL would also reduce the head-media-spacing significantly, which in turn improves the signal-to-noise ratio and the magnetic recording performance. Also, if the annealing is done in a forming gas, such as a reducing atmosphere of argon plus 10% hydrogen, then the annealing may also de-oxidize and thus recover the Co magnetic material at the damaged edges of the islands.

In this invention the data islands are preferably formed of an alloy consisting essentially only of Co, Cr and Pt, with the preferred composition being $Co_{(100-x-y)}Cr_xPt_y$ (where the subscripts are in atomic percent), x is between 5 and 35 and y is between 5 and 35. The alloy may also be based on Co$_3$Pt alloys that provide high Hc values. Thus the CoCrPt alloy may be of the form $(Co_{75}Pt_{25})_{(100-x)}Cr_x$, where the subscripts are in atomic percent and x is between 5 and 35.

The prior art in FIGS. 3A-3E and the method of the invention in FIGS. 4A-4C have been described wherein a HM layer is used and the resist pattern is transferred into the HM layer, with the patterned HM then being used to pattern the RL. However, some resist materials may not require a HM so that the patterned resist layer is used to directly transfer the pattern into the RL. The method of this invention is fully applicable to such a nanoimprinting method that does not use a HM layer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a patterned perpendicular magnetic recording medium having discrete islands of recording layer material, recesses between the islands, and nonmagnetic fill material in the recesses, the method comprising:
    providing a substrate;
    depositing on the substrate an underlayer;
    depositing on the underlayer a recording layer comprising Co, Cr and Pt;
    depositing on the recording layer a resist layer;
    patterning the resist layer;
    etching the recording layer down to the underlayer, using the patterned resist layer as a mask, to transfer the pattern of the patterned resist layer into the recording layer;
    removing the resist layer to expose discrete islands of recording layer material separated by exposed underlayer, the islands having sidewalls and being arranged in radially-spaced tracks and spaced along the tracks, the exposed underlayer and island sidewalls defining said recesses between the islands without fill material;
    after removing the resist layer, annealing the islands of recording layer material separated by exposed underlayer, the annealing comprising heating to a temperature greater than or equal to 350 degrees C. and less than or equal to 400 degrees C. and thereafter cooling to below said temperature; and
    after said cooling, depositing the fill material over the islands into the recesses into contact with the exposed underlayer and island sidewalls.

2. The method of claim 1 further comprising depositing on the recording layer a hard mask layer prior to depositing the resist layer; wherein etching the recording layer, using the patterned resist layer as a mask, includes etching the underlying hard mask layer to transfer the pattern of the patterned resist layer into the hard mask layer prior to transferring it into the recording layer; and wherein removing the resist layer includes removing the hard mask layer.

3. The method of claim 2 wherein depositing a hard mask layer comprises depositing a hard mask layer directly on and in contact with the recording layer.

4. The method of claim 3 further comprising depositing a silicon nitride protection layer directly on and in contact with the recording layer and wherein depositing a hard mask layer comprises depositing a hard mask layer directly on and in contact with the silicon nitride layer.

5. The method of claim 2 wherein the hard mask layer consists essentially of diamond-like carbon.

6. The method of claim 1 wherein the resist is a nanoimprint resist and wherein patterning the resist comprises patterning the resist with a nanoimprint template.

7. The method of claim 1 wherein the fill material is selected from $SiO_2$, $Al_2O_3$, a polymeric material and a nonmagnetic metal, and further comprising chemical-mechanical-polishing (CMP) the fill material to provide a substantially planarized medium surface.

8. The method of claim 1 wherein annealing comprises annealing in a vacuum.

9. The method of claim 1 wherein annealing comprises annealing in an inert gas.

10. The method of claim 1 wherein annealing comprises annealing in a reducing atmosphere comprising argon and hydrogen.

11. The method of claim 1 wherein the recording layer consists essentially of Co, Cr and Pt, wherein Cr is present in an amount of at least 10 atomic percent.

12. The method of claim 1 wherein the recording layer consists essentially of Co, Cr and Pt with a composition of the form $(Co_{75}Pt_{25})_{(100-x)}Cr_x$, where the subscripts are in atomic percent and x is greater than or equal to 5 and less than or equal to 35.

13. The method of claim 1 wherein the discrete islands of the recording layer material have a lateral dimension parallel to the substrate greater than 5 nm and less than 20 nm.

14. A method for making a patterned perpendicular magnetic recording medium comprising:

provizzling a substrate;

depositing on the substrate an underlayer;

depositing on the underlayer a recording layer comprising Co, Cr and Pt;

depositing on the recording layer a hard mask layer;

depositing on the hard mask layer a nanoimprint resist layer;

patterning the resist layer with a nanoimprint template;

etching the hard mask layer to transfer the pattern of the patterned resist layer into the hard mask layer;

etching the recording layer, using the patterned hard mask layer as a mask, to transfer the pattern of the patterned resist layer into the recording layer;

removing the resist layer and hard mask layer to expose the underlayer and a pattern of discrete islands of recording layer material on the underlayer, the islands having sidewalls and being arranged in radially-spaced tracks and spaced along the tracks, the exposed underlayer and island sidewalls defining recesses between the islands;

annealing the islands of recording layer material in an atmosphere selected from an inert gas and a reducing atmosphere comprising argon and hydrogen, the annealing comprising heating to a temperature greater than or equal to 350 degrees C. and less than or equal to 400 degrees C. and thereafter cooling to below said temperature;

after said cooling, depositing fill material over the islands into the recesses into contact with the exposed underlayer and island sidewalls; and planarizing the fill material.

* * * * *